United States Patent
Kim

(10) Patent No.: US 11,450,326 B2
(45) Date of Patent: Sep. 20, 2022

(54) DEVICE FOR RECOGNIZING VOICE CONTENT, SERVER CONNECTED THERETO, AND METHOD FOR RECOGNIZING VOICE CONTENT

(71) Applicant: LG ELECTRONICS INC., Seoul (KR)

(72) Inventor: Namgeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 16/782,413

(22) Filed: Feb. 5, 2020

(65) Prior Publication Data
US 2020/0411015 A1    Dec. 31, 2020

(30) Foreign Application Priority Data

Jun. 28, 2019  (KR) .......................... 10-2019-0077775

(51) Int. Cl.
| | | |
|---|---|---|
| *G10L 17/24* | (2013.01) | |
| *G10L 17/18* | (2013.01) | |
| *G10L 19/26* | (2013.01) | |
| *B25J 19/04* | (2006.01) | |
| *B25J 13/00* | (2006.01) | |
| *B25J 9/16* | (2006.01) | |
| *B25J 19/02* | (2006.01) | |
| *B25J 11/00* | (2006.01) | |

(Continued)

(52) U.S. Cl.
CPC .............. *G10L 17/24* (2013.01); *B25J 9/163* (2013.01); *B25J 11/0015* (2013.01); *B25J 13/003* (2013.01); *B25J 19/026* (2013.01); *B25J 19/04* (2013.01); *G06V 40/10* (2022.01); *G10L 15/22* (2013.01); *G10L 17/18* (2013.01); *G10L 19/265* (2013.01); *G10L 2015/227* (2013.01)

(58) Field of Classification Search
CPC ....... G10L 15/22; G10L 15/065; G10L 15/07; G10L 15/075; G10L 2015/226; G10L 2015/227; G10L 2015/228
See application file for complete search history.

(56) References Cited

U.S. PATENT DOCUMENTS

| | | | | |
|---|---|---|---|---|
| 2004/0111259 A1* | 6/2004 | Miller | ................... | G10L 15/19 704/E15.044 |
| 2005/0049872 A1* | 3/2005 | Dharanipragada | ..... | G10L 15/07 704/E15.011 |

(Continued)

*Primary Examiner* — Samuel G Neway
(74) *Attorney, Agent, or Firm* — KED & Associates, LLP

(57) ABSTRACT

An artificial intelligence (AI) device, such as a robot, comprises: an output interface to output content in response to a request of a user; a camera to acquire an image of the user; a microphone to acquire a voice signal including a voice content uttered by the user; a processor to determine a characteristic of the user based on the content, the image, and/or the voice signal, and recognize the voice content through a voice recognition mode corresponding to the determined characteristic. The AI device may include a communication interface to forward the voice signal to a remote computer that identifies the characteristic and recognizes the voice content based on the characteristic. According to an embodiment, when an irregular voice is recognized from the acquired voice signal, the processor may recognize a regular voice corresponding to the irregular voice using an artificial intelligence-based learning model.

17 Claims, 12 Drawing Sheets

(51) Int. Cl.
*G06V 40/10* (2022.01)
*G10L 15/22* (2006.01)

(56) References Cited

U.S. PATENT DOCUMENTS

| | | | | |
|---|---|---|---|---|
| 2007/0198263 | A1* | 8/2007 | Chen | G10L 15/065 |
| | | | | 704/E15.009 |
| 2009/0191521 | A1* | 7/2009 | Paul | A61B 5/165 |
| | | | | 600/300 |
| 2010/0070278 | A1* | 3/2010 | Hagen | G10L 15/144 |
| | | | | 704/250 |
| 2010/0185444 | A1* | 7/2010 | Olsen | G10L 17/20 |
| | | | | 704/200 |
| 2010/0268538 | A1* | 10/2010 | Ryu | G10L 17/00 |
| | | | | 704/250 |
| 2015/0081288 | A1* | 3/2015 | Kim | G10L 15/30 |
| | | | | 704/231 |
| 2016/0019887 | A1* | 1/2016 | Kim | G10L 15/183 |
| | | | | 704/246 |
| 2016/0140964 | A1* | 5/2016 | Connell, II | G10L 15/25 |
| | | | | 704/231 |
| 2017/0069314 | A1* | 3/2017 | Mun | G10L 15/183 |
| 2018/0174580 | A1* | 6/2018 | Kim | G10L 15/197 |
| 2019/0325864 | A1* | 10/2019 | Anders | G10L 15/22 |
| 2020/0395021 | A1* | 12/2020 | Matthews | G10L 17/22 |
| 2020/0411015 | A1* | 12/2020 | Kim | G06V 10/82 |

\* cited by examiner

FIG. 10
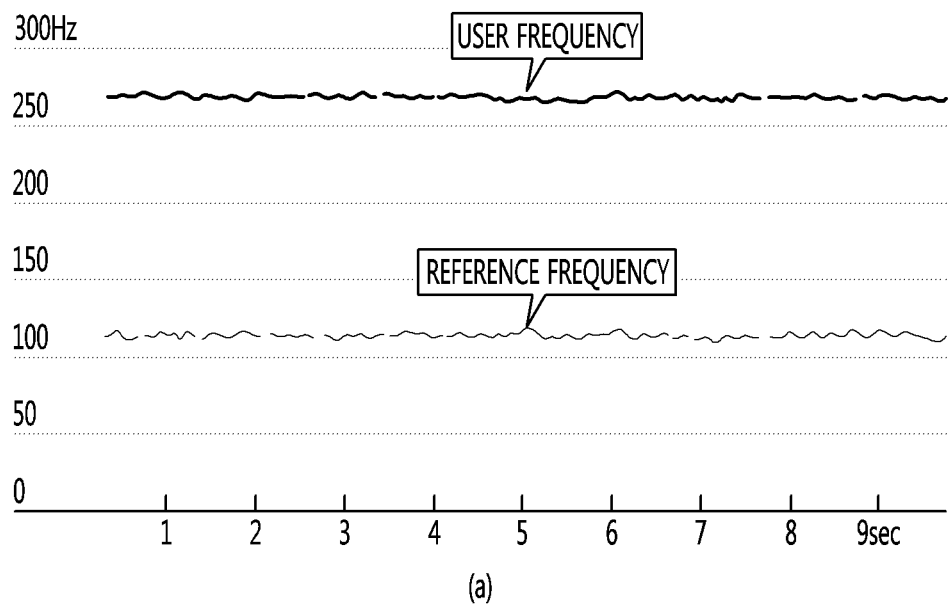
(a)
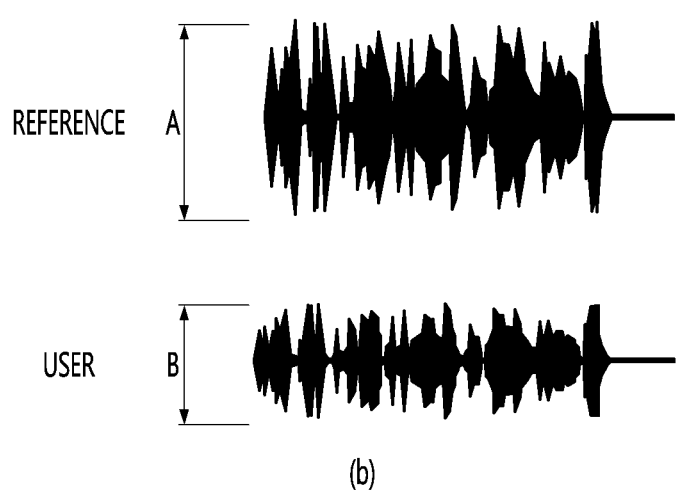
(b)

DEVICE FOR RECOGNIZING VOICE CONTENT, SERVER CONNECTED THERETO, AND METHOD FOR RECOGNIZING VOICE CONTENT

CROSS-REFERENCE TO RELATED APPLICATION(S)

The present application claims priority under 35 U.S.C. 119 and 35 U.S.C. 365 to Korean Patent Application No. 10-2019-0077775, filed in Korea on Jun. 28, 2019, which is hereby incorporated by reference in its entirety.

BACKGROUND

1. Field

The present disclosure relates to a device, such as a robot, for recognizing voice content uttered by a user, a server connected thereto, and a method for recognizing voice content.

2. Background

A robot may refer to a machine that automatically processes or operates a given task by its own ability, and the robot may have applications in a variety of fields, such as an application in an industrial field, a medical field, a space field, a marine field, and so forth. A communication robot may perform communications or interaction with humans through a voice, a gesture or the like.

Such a communication robot may include various kinds of robots such as a guide robot arranged in a specific position to guide all sorts of information to a user, a home robot included at home, and so forth. In addition, the communication robot may include an educational robot that instructs or helps a user learn through the interaction with a learner.

The communication robot may be configured to perform the interaction with the user, the learner or the like, by using various constitutions. For example, the communication robot may include a microphone acquiring a sound created around the robot, or a camera acquiring an image around the robot.

In order to implement a robot more vividly, the robot may output an interface (e.g., a facial expression, a sound and the like) corresponding to emotions of the robot depending on a predetermined input or an event occurrence, through a display, a speaker or the like. However, robots may typically output only a limited number of interfaces for the same input or event, such that there is a limit to smoothly expressing an emotion change.

BRIEF DESCRIPTION OF THE DRAWINGS

Embodiments will be described in detail with reference to the following drawings in which like reference numerals refer to like elements, and wherein:

FIG. 10 is an exemplified view for illustrating a characteristic difference between a voice signal of a user and a predetermined reference voice signal;

DETAILED DESCRIPTION

Figure 1:
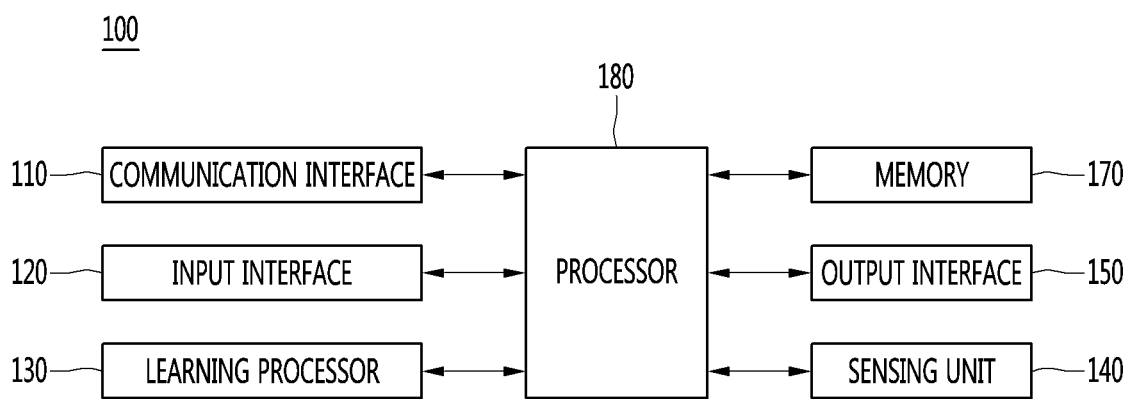
FIG. 1 illustrates an artificial intelligence (AI) device including a robot according to an embodiment of the present disclosure.

A robot may refer to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot may include a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyper-parameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method. The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an artificial intelligence (AI) device 100, such as a robot according to an embodiment of the present disclosure. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing unit 140, an output interface 150, a memory 170, and a processor 180. The communication interface (or antenna) 110 may transmit and receive data to and from external devices such as other AI devices 100a to 100e and/or the AI server 200 by using wire/wireless communication technology. For example, the communication interface 110 may transmit and receive sensor information, a user input, a learning model, and a control signal to and from external devices. The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface (or input device) 120 may acquire various kinds of data. The input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information. The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor (or controller) 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation. The learning processor 130 may perform AI processing together with the learning processor 240 of the AI server 200.

The learning processor 130 may include a memory integrated or implemented in the AI device 100. Alternatively, the learning processor 130 may be implemented by using the memory 170, an external memory directly connected to the AI device 100, or a memory held in an external device.

The sensing unit (or sensor) 140 may acquire at least one of internal information about the AI device 100, ambient environment information about the AI device 100, and user information by using various sensors. Examples of the sensors included in the sensing unit 140 may include a proximity sensor, an illuminance sensor, an acceleration sensor, a magnetic (or Hall) sensor, a gyro (or gyroscopic) sensor, an inertial sensor, an red green blue (RGB or image) sensor, an infrared (IR) sensor, a fingerprint recognition sensor, an ultrasonic sensor, an optical sensor, a microphone, a lidar, and/or a radar.

The output interface (or output device) 150 may generate an output related to a visual sense, an auditory sense, or a haptic sense. For example, the output interface 150 may include a display unit for outputting time information, a speaker for outputting auditory information, and/or a haptic module for outputting haptic (or vibration) information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation. To this end, the processor 180 may request, search, receive, or utilize data of the learning processor 130 or the memory 170. In certain examples, the processor 180 and learning processor 130 may be implemented as a single component, logic circuit, or board.

The processor 180 may control the components of the AI device 100 to execute the predicted operation or the operation determined to be desirable among the at least one executable operation. When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information. The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model. The processor 180 may control at least part of the components of AI device 100 so as to execute an application program stored in memory 170. Furthermore, the processor 180 may operate two or more of the components included in the AI device 100 in combination so as execute drive the application program.

Figure 2:
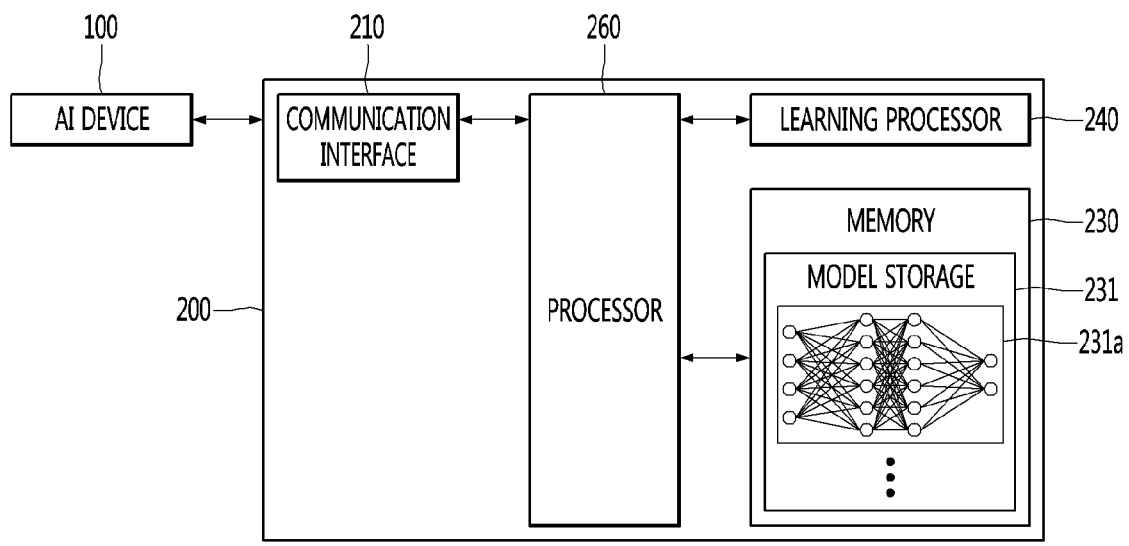
FIG. 2 illustrates an AI server connected to a robot according to an embodiment of the present disclosure.

FIG. 2 illustrates an AI server 200 connected to a robot according to an embodiment of the present disclosure. Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like. The communication interface 210 can transmit and receive data to and from an external device such as the AI device 100. The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100. The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value. In some examples, the processing 260 and the learning processor 230 may be implemented in a common component, circuitry, or circuit board.

Figure 3:
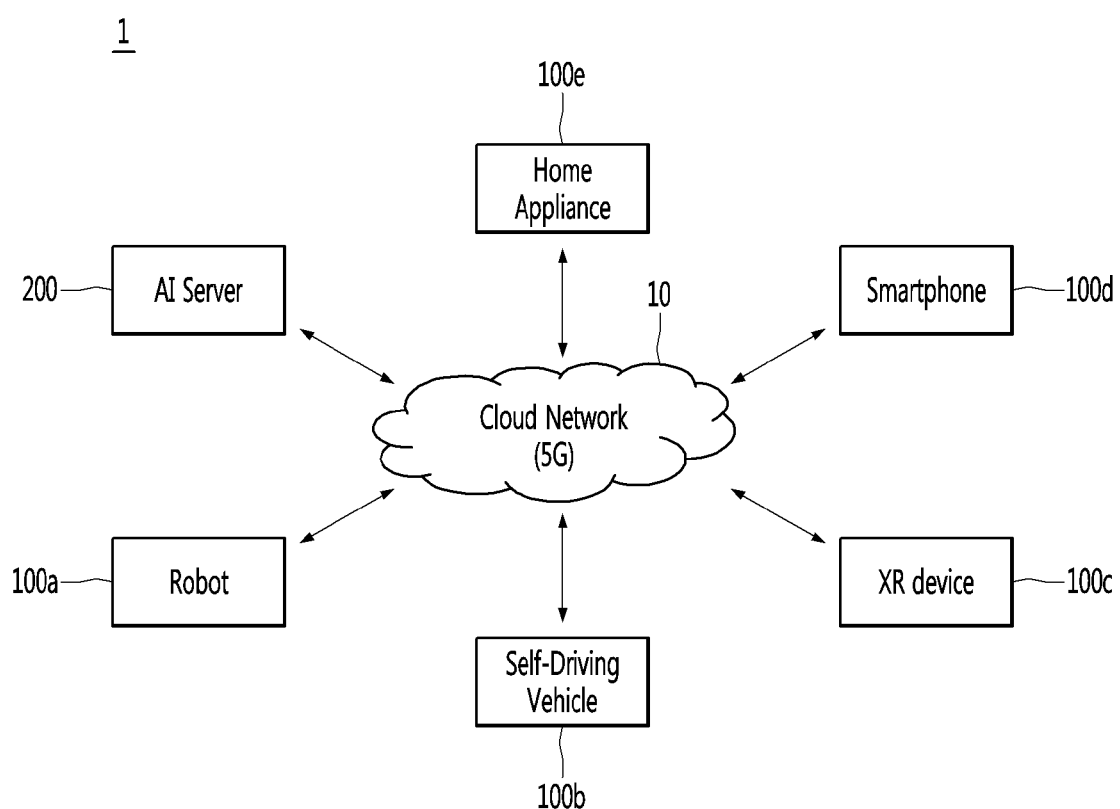
FIG. 3 illustrates an AI system according to an embodiment of the present disclosure.

FIG. 3 illustrates an AI system 1 according to an embodiment of the present disclosure. Referring to FIG. 3, in the AI system 1, at least one of an AI server 200, a robot 100a, a self-driving vehicle 100b, an XR device (or other virtual or augmented reality device) 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network, wired networking (e.g., using Ethernet), a local wireless network (e.g., using Wifi®), etc. The devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data. The AI server 200 may be connected to at least one of the AI devices constituting the AI system 1, such as, the robot 100a, the self-driving vehicle 100b, the XR device 100c, the smartphone 100d, or the home appliance 100e through the cloud network 10, and may assist at least part of AI processing of the connected AI devices 100a to 100e.

The AI server 200 may learn the artificial neural network according to the machine learning algorithm instead of the AI devices 100a to 100e, and may directly store the learning model or transmit the learning model to the AI devices 100a to 100e. The AI server 200 may receive input data from the AI devices 100a to 100e, may infer the result value for the received input data by using the learning model, may generate a response or a control command based on the inferred result value, and may transmit the response or the control command to the AI devices 100a to 100e. Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like. The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation. The robot 100a may use the sensor information acquired from at least of a lidar, a radar, or a camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200. The robot 100a may perform the learning operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan. The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. For example, the robot 100a may acquire the intention information of the interaction due to the user's operation or speech utterance, and may determine the response based on the acquired intention information, and may perform the operation.

Figure 4:
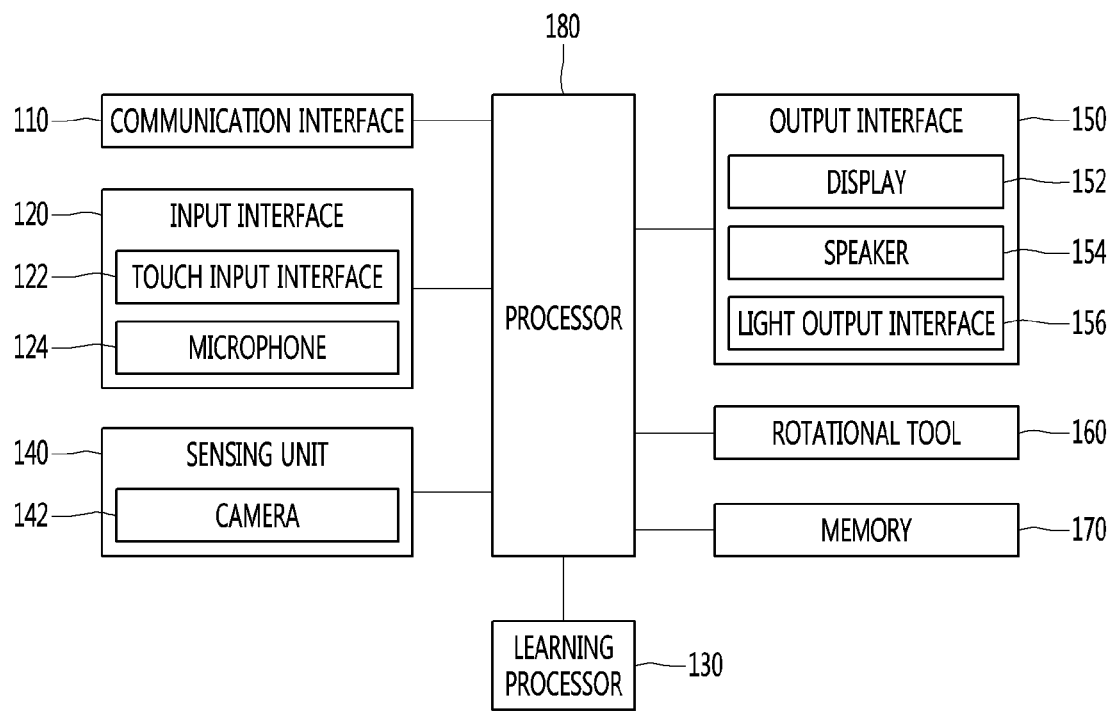
FIG. 4 is a block diagram illustrating a control configuration of robot according to an embodiment of the present disclosure.

Hereinafter, a variety of embodiments of the configuration of a robot and a method for recognizing a voice using the robot according to the present disclosure will be described. FIG. 4 is a block diagram illustrating a control configuration of robot according to an embodiment of the present disclosure.

With reference to FIG. 4, the robot 100a may comprise the communication interface 110, the input interface 120, the learning processor 130, the sensing unit 140, the output interface 150, a rotational tool 160, the memory 170, and the processor 180. The elements illustrated in FIG. 4 are an example for convenience of explanation, and the robot 100a may include more or less elements than the elements illustrated in FIG. 4. Since the contents related to the AI device 100 of FIG. 1 are similarly applied to the robot 100a of the present disclosure, the contents overlapping with those described in FIG. 1 will be omitted.

The communication interface 110 may include communication modules for connecting the robot 100a to a server, a mobile terminal, another robot and so forth, through a network. Each of the communication modules may support one of communication schemes described in FIG. 1. For example, the robot 100a may be connected to the network through an access point such as a router and the like. Accordingly, the robot 100a may provide all sorts of information acquired through the input interface 120, the sensing unit 140 or the like, to the server or the mobile terminal through the network. The server may correspond to the AI server 200 described in FIG. 2, and the server 200 may receive image data, a voice signal and the like, from the robot 100a, and may estimate a user characteristic from the received image data and/or the received voice signal.

The input interface 120 may include at least one input device acquiring all sorts of data. For example, the at least one input device may include a physical input device such as a button, a dial or the like; a touch input interface device 122 such a touch pad or a touch panel; a microphone 124 receiving a voice of the user or a sound around the robot 100a; a camera, and so forth. The user may input all sorts of requests or commands to the robot 100a through the input interface 120.

The processor 180 may transmit data associated with the voice data of the user received through the microphone 124 to the server through the communication interface 110. The server may recognize trigger words, or commands, requests and the like in the voice data by analyzing the voice data, and provide the recognized result to the robot 100a. According to the embodiment, the server may be implemented as the AI server 200 described in FIG. 2, and in this case, the server may recognize the trigger words, the commands, the requests and the like in the voice data through a model (the artificial neural network 231a) learned through the learning processor 230. The processor 180 may perform an operation corresponding to a recognizing result of processing the commands or requests based on the recognized result.

According to an embodiment, the processor 180 may directly recognize the trigger word, the commands, the requests and the like in the voice data, through the model learned by the learning processor 130 in the robot 100a. In addition, the processor 180 may receive data corresponding to the learned model from the server and store the data in the memory 170, and may recognize the trigger words, the commands, the requests and the like in the voice data, through the stored data.

The sensing unit 140 may include at least one sensor for sensing various information around the robot 100a. For example, the sensing unit 140 may include various sensors such as a camera 142, a proximity sensor, an illuminance sensor, a gyro sensor (a gyroscope) and the like. The camera 142 may acquire an image around the robot 100a. According to the embodiment, the processor 180 may recognize the user by acquiring the image including the user's face through the camera 142, or acquire the user's gesture, expression or the like.

The proximity sensor may sense an access of an object such as the user and the like, around the robot 100a. For example, if the access of the user is sensed by the proximity sensor, the processor 180 may induce the user to use the robot 100a by outputting an initial screen or an initial voice through the output interface 150.

The illuminance sensor may sense brightness of a space in which the robot 100a is arranged. The processor 180 may control elements so as to perform various operations based a sensing result and/or time zone information of the illuminance sensor. The touch sensor may sense that a portion of the user's body contacts a predetermined area of the robot 100a. The gyro sensor may sense a rotation angle, a slope or the like of the robot 100a. The processor 180 may recognize a direction that the robot 100a faces, or sense an impact and so forth from the outside, based on the sensed result of the gyro sensor.

The output interface 150 may output all sorts of information or contents associated with an operation or a state of the robot 100a, and all sorts of services, programs, applications and so forth, executed in the robot 100a. In addition, the output interface 150 may output all sorts of messages or information for performing the interaction with the user.

The output interface 150 may include a display 152, a speaker 154, a light output interface 156 and so forth. The display 152 may output all sorts of information or messages described above in a graphic form. According to the embodiment, the display 152 may be embodied in a touch screen form with a touch input interface 122, and in this case, the display 152 may function as an input device as well as an output device.

The speaker 154 may output all sorts of information or messages in an audio or sound form. The light output interface 156 may be embodied with a light source such as LED and the like. The processor 180 may display a state and the like of the robot 100a through the light output interface 156. According to the embodiment, the light output interface 156 may provide all sorts of information to the user along with the display 152 and/or the speaker 154 as an auxiliary output device.

The rotational tool (or motor) 160 may include elements (such as a rotation motor and the like) for rotating the robot 100a around a vertical axis. The processor 180 may change a direction that the display 152 and the camera 142 of the robot 100a face, by rotating the robot 100a by controlling the rotational tool 160. According to an embodiment, the rotational tool 160 may further include elements (such as a tilt motor and the like) for tilting the robot 100a in a forward and backward direction at a predetermined angle.

All sorts of data such as control data for controlling the operations of the elements included in the robot 100a, data for performing an operation based on an input acquired through the input interface 120 or information acquired through the sensing unit 140, and so forth, may be stored in the memory 170. In addition, program data of a software module, an application or the like, executed by at least one processor or controller included in the processor 180 may be stored in the memory 170. Such a memory 170 may include various storage devices such as ROM, RAM, EPROM, a flash drive, a hard drive and so forth, hardware wise.

The processor 180 may include at least one processor or controller for controlling the operation of the robot 100a. For example, the processor 180 may include at least one CPU, an AP (application processor), a microcomputer (or a micom), an integrated circuit, an ASIC (application specific integrated circuit) and so forth.

Figure 5:
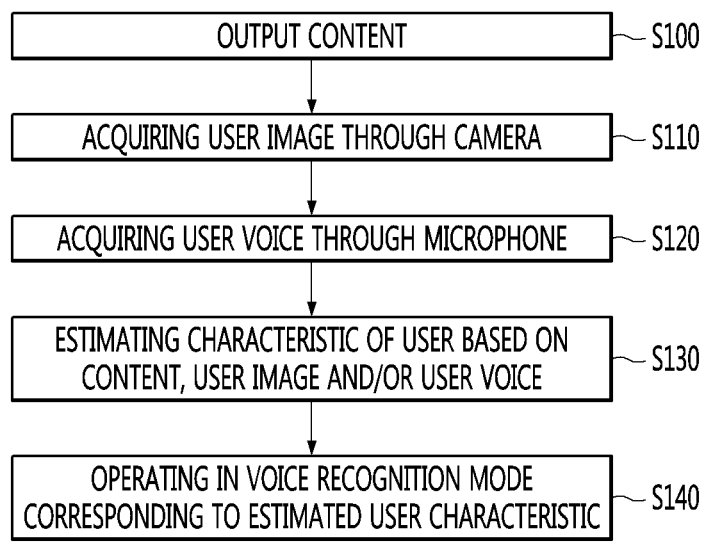
FIG. 5 is a flowchart for explaining an embodiment of operating a robot or a server connected thereto in a voice recognition mode according to a characteristic of a user.

FIG. 5 is a flowchart for explaining an embodiment of operating a robot or a server connected thereto in a voice recognition mode according to a characteristic of a user. With reference to FIG. 5, the robot 100a may output a predetermined content (S100). The processor 180 may provide the user with the content corresponding to a content entry request received through the input interface 120 and so forth. For example, the content entry request may respond to a request of outputting one of a plurality of images and/or sound contents provided through a specific application. In addition, the content entry request may respond to an execution request of an application providing specific contents. The processor 180 may output the content through the display 152 and/or the speaker 154.

The robot 100a may acquire a user image through the camera 142 (S110) and/or acquire a user sound through the microphone 124 (S120). The processor 180 may acquire an image (the user image) including the user through the camera 142, at an output initiation point of the content or a random time during an output of the content. In addition, the processor 180 may acquire a voice (e.g., the user voice) of the user through the microphone 124, at an output initiation point of the content or a random time during an output of the content. Either step S110 or step S120 may be performed, or both steps may be performed.

The robot 100a or the server 200 may estimate the characteristic of the user based on the content, the user image and/or the user voice (S130). For example, the characteristic of the user may include an age group of the user, a gender, and so forth. The processor 180 of the robot 100a may estimate the age group or gender of the user from information about the outputted content. For example, if the outputted content is content for childhood education, the processor 180 may estimate that the user falls under an age group corresponding to "a child".

According to the embodiment, the processor 180 may estimate the characteristic of the user from the user image acquired through the camera 142. For example, the processor 180 may extract a face area of the user among the user image through a face recognition algorithm, and may estimate the characteristic of the user through characteristic points, a pixel pattern or like of the extracted face area. In addition, the processor 180 may estimate the characteristic of the user through a body characteristic such as a height of the user and the like, or an analysis of clothes worn by the user in the user image.

According to an embodiment, the processor 180 may estimate the characteristic of the user from the user voice acquired through the microphone 124. For example, the processor 180 may estimate the characteristic of the user based on an intensity (amplitude) and a frequency characteristic of the voice signal corresponding to the user voice, and an utterance characteristic (a tone, a pronunciation, utterance speed and the like) recognized from the voice signal. The processor 180 may estimate the characteristic of the user by using only one of the content, the user image and the user voice, but may finally estimate the characteristic of the user through each combination of at least two estimating results according to the embodiment.

According to the embodiment, an operation of estimating the characteristic of the user may be performed by the server 200 connected to the robot 100a. In this case, the processor 180 may transmit information for the outputted content, the user image (image data) acquired through the camera 142, and/or the user voice (the voice signal) acquired through the microphone 124 to the server 200. In general, since processing performance of the server 200 may exceed the processing performance of the robot 100a, the characteristic of the user may be more exactly estimated by the server 200. In this case, the server 200 may transmit the estimating result for the characteristic of the user to the robot 100a, and the robot 100a may set a voice recognition mode corresponding to the received estimating result.

The robot 100a or the server 200 may recognize the voice of the user by operating in the voice recognition mode corresponding to the estimated characteristic of the user (S140). The processor 180 of the robot 100a or the processor 260 of the server 200 may recognize the voice of the user acquired through the microphone 124, by using the voice recognition mode corresponding to the estimated characteristic of the user.

For example, a default voice recognition mode of the robot 100a or the server 200 may be a mode suitable for recognizing a voice of "an adult male". In the case of the default voice recognition mode, voice recognition accuracy may be lowered for a voice uttered from the user (for example, a child) who is not the adult male but a user having a different characteristic. Therefore, according to the embodiment of the present disclosure, the robot 100a or the server 200 may recognize the voices of various users more exactly, through the voice recognition mode corresponding to the estimated characteristic of the user.

Figure 6:
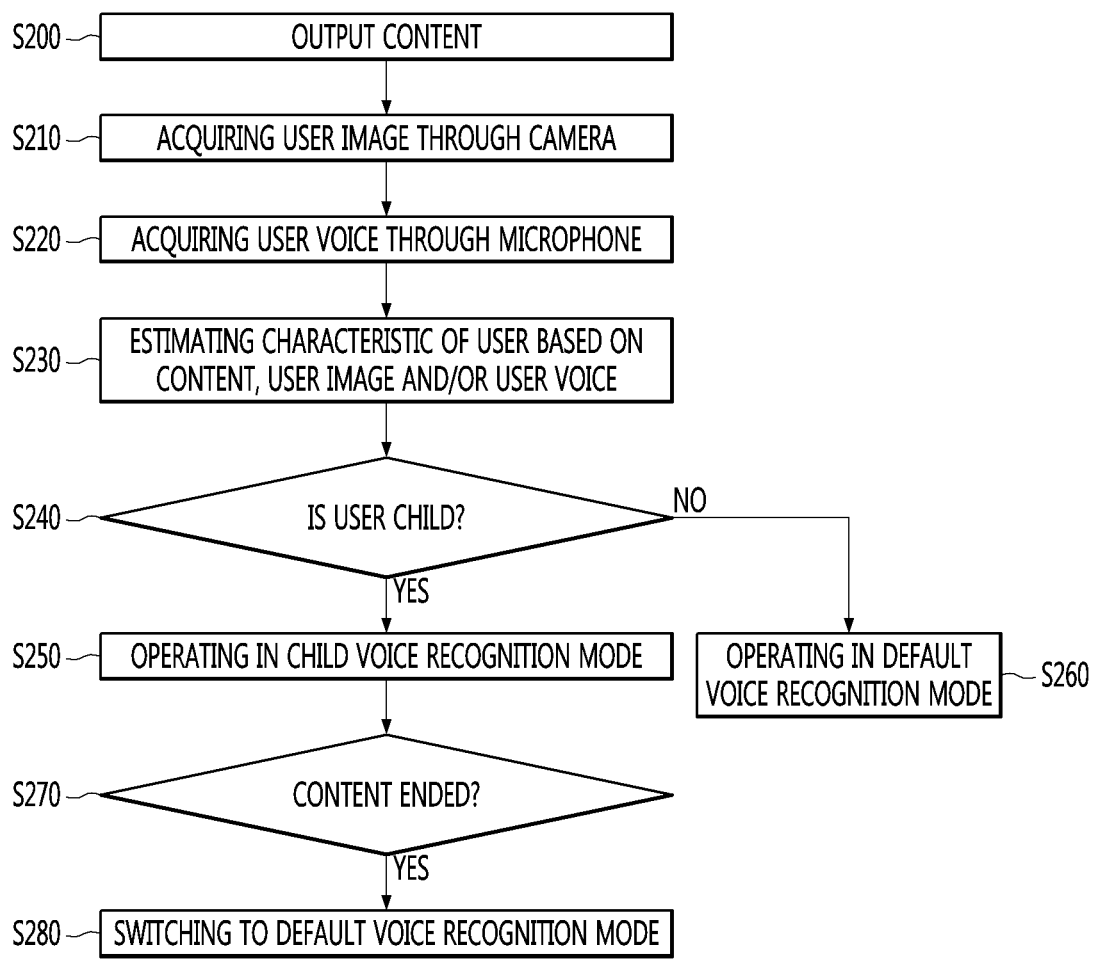
FIG. 6 is a flowchart for explaining an embodiment of operating the robot or the server in a child-voice recognition mode when an user is determined to be a child, with regard to the embodiment of FIG. 5.

FIG. 6 is a flowchart for explaining an embodiment of operating the robot or the server in a child-voice recognition mode when a user is determined to be a child. The flowchart in FIG. 6 is described under the assumption that the voice recognition mode of the robot 100a or the server 200 includes the default voice recognition and the child-voice recognition mode. It should be appreciated, however, that other modes may be used, such as modes based on, for example, gender, occupation, education level, location, nationality, age, etc. With reference to FIG. 6, steps S200 and S230 are substantially identical to steps S100 and S130 in FIG. 5, and the explanation therefor is omitted.

If the characteristics of the user corresponds to "the child" (YES in S240), the robot 100a or the server 200 may operate in the child-voice recognition mode (S250). When the user is determined to be a child, the voice signal received through the microphone 124 may correspond to a voice of the child. In this case, the characteristic of the voice signal may be different from a voice characteristic of reference data for the voice recognition (for example, the characteristic of the voice signal of the adult male). Therefore, the processor 180 of the robot 100a or the processor 260 of the server 200 may adjust the voice signal received through the microphone 124 to correspond to the voice characteristic of the reference data, and may perform a voice recognition operation by using the adjusted voice signal.

In addition, words, phrases or sentences that the child utters may be different form from words, phrases or sentences that the adult utter. For example, the robot 100a or the server 200 may acquire a voice having a regular grammar or shape and recognize a corresponding command or a meaning of the acquired voice. However, the child may utter an irregular voice (for example, a phrase, a sentence or the like, having a conversational style and grammatical errors), not the regular grammar or shape. When the robot 100a or the server 200 operates in the child-voice recognition mode, even if the irregular voice is acquired, the robot 100a or the server 200 enables smooth voice processing by recognizing a regular voice corresponding to the irregular voice. The contents associated with the child-voice recognition mode will be described in more detail later through FIGS. 9 to 13. If the user is determined to not be a "child" (NO of S240), the robot 100a or the server 200 may operate in the default voice recognition mode (S260).

If the presentation of content is terminated or ends during the operation in the child-voice recognition mode (YES of S270), the robot 100a or the sever 200 may operate by switching to the default voice recognition mode (S280). According to another embodiment, after the content is terminated, the robot 100a or the server 200 may keep the voice recognition mode in the child-voice recognition mode if a current user is constantly recognized as a child.

Figure 7:
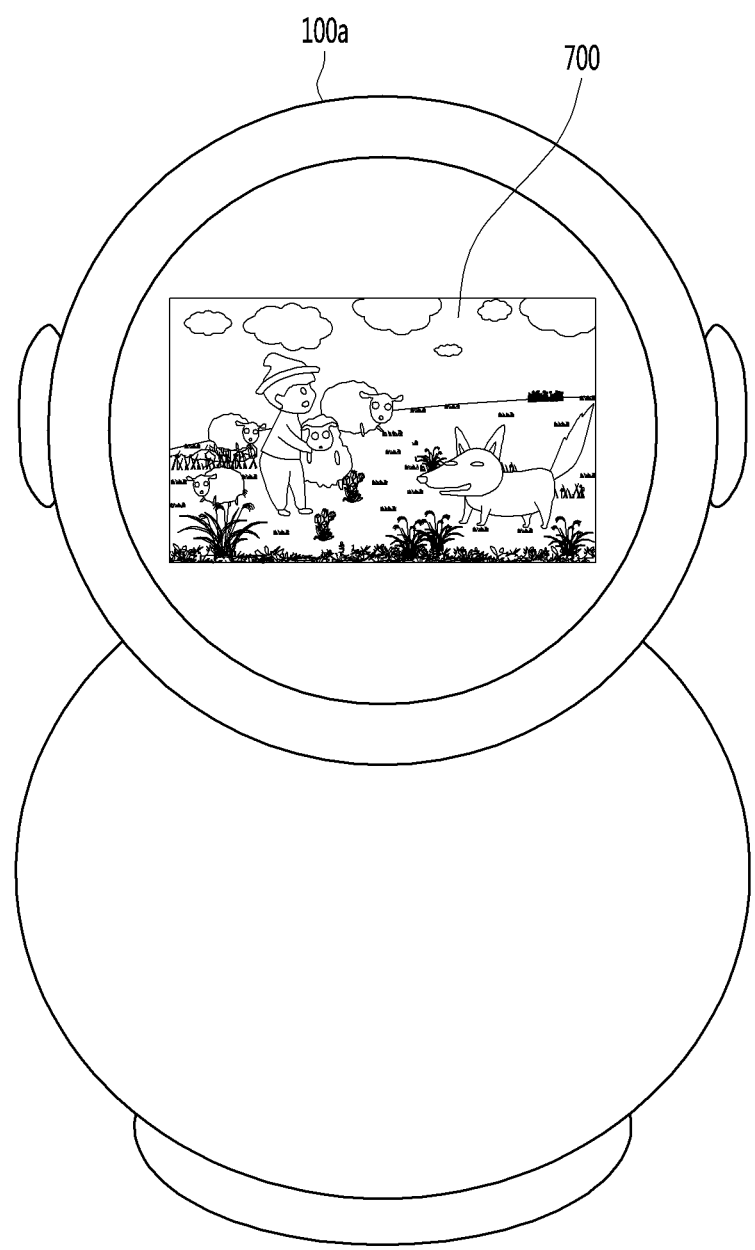
FIGS. 7 and 8 are exemplified views for explaining an operation that the robot or the server estimates the characteristic of the user, with regard to the embodiment of FIG. 6.
Figure 8:
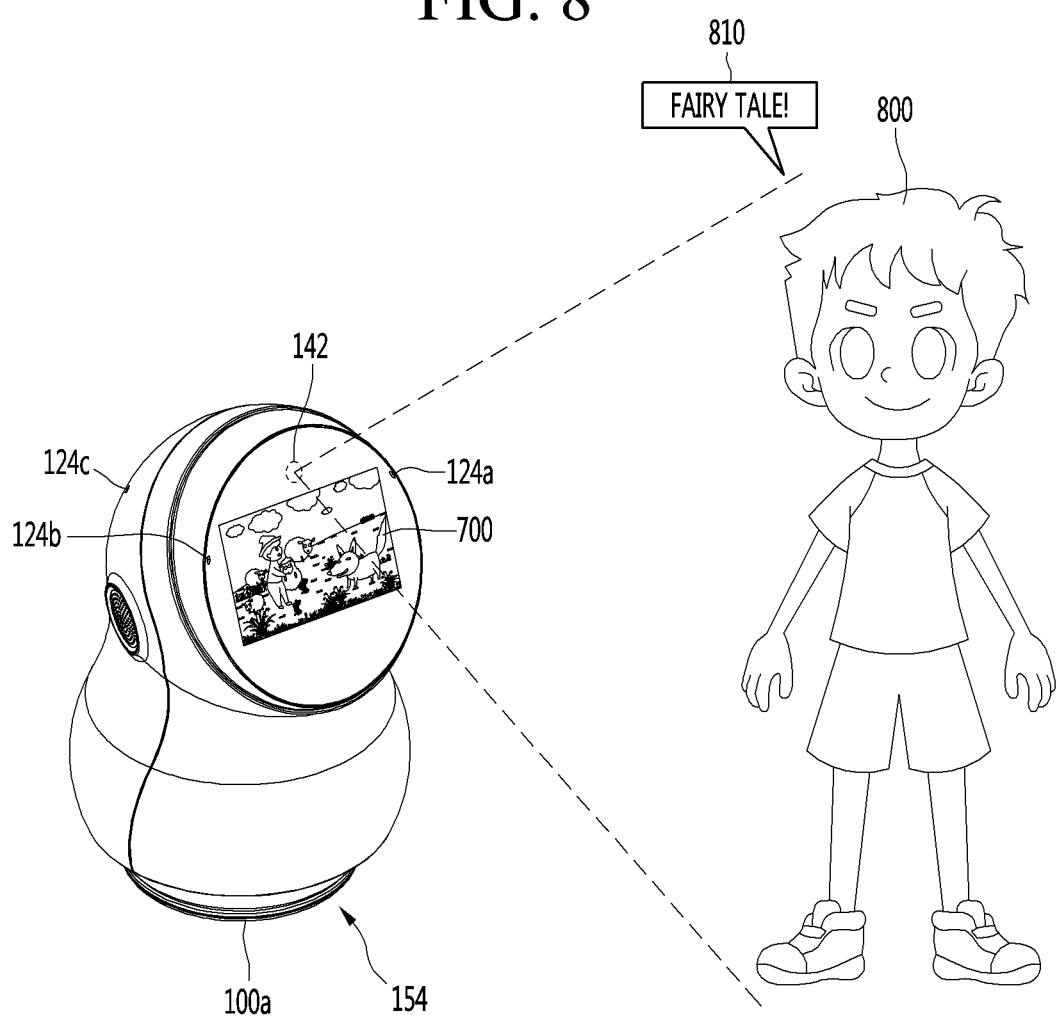

FIGS. 7 and 8 are exemplified views for explaining an operation that the robot or the server estimates the characteristic of the user, with regard to the embodiment of FIG. 6. With regard to FIG. 7, the processor 180 may execute the content in response to the content entry request of the user, and output a screen 700 associated with the content through the display 152.

Meanwhile, the processor 180 may estimate the characteristic for a main user of the content based on information of the executed content. For example, the information of the content may include a content name, a content category, age limit information, user statistics and so forth. For example, the processor 180 may estimate that the user is the child, by acquiring that the executed content is a fairy tale content, from the information. In addition, the processor 180 may transmit the information of the executed content to the server 200, and the processor 260 of the server 200 may estimate the characteristic of the user from the information of the received content.

With reference to FIG. 8, the processor 180 may acquire the user image including a user 800 through the camera 142. The processor 180 may estimate that the user 800 is the child, from body characteristics (a face, a height, hair style, color, etc.) or a characteristic of clothes of the user 800 included in the acquired user image.

In addition, the processor 180 may acquire a voice 810 uttered by the user 800 through the microphone 124a to 124c, and determine whether the user 800 is the child, based on a signal characteristic (a frequency, an intensity, etc.) of the acquired voice 810, or an utterance characteristic (a word level, a tone, a pronunciation, an utterance speed, etc.) based on recognition of the acquired voice 810.

According to the embodiment, if a plurality of microphones 124a to 124c are provided in the robot 100a, the processor 180 may recognize a position and/or a direction of the user 800 from voice signals acquired from each of the plurality of microphones 124a to 124c. In this case, the processor 180 may perform the voice recognition operation only for the voice signal acquired from the recognized position or direction, when a recognition operation of the voice is performed in a set voice recognition mode. For example, if multiple voices are captured, only the voice in the direction of the user may be evaluated.

Figure 9:
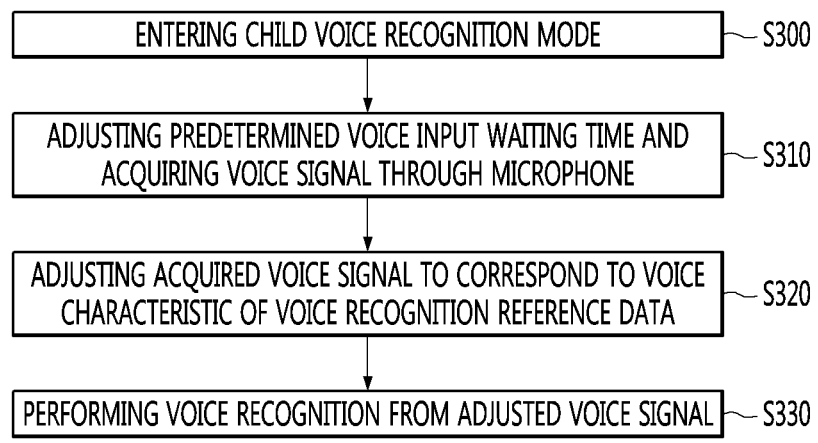
FIG. 9 is a flowchart for explaining an embodiment of an operation that the robot or the server performs a voice recognition in the child-voice recognition mode.

FIG. 9 is a flowchart for explaining an embodiment of an operation that the robot or the server performs a voice recognition in the child-voice recognition mode. FIG. 10 is an exemplified view for illustrating a characteristic difference between a voice signal of a user and a predetermined reference voice signal. With reference to FIG. 9, the robot 100a or the server 200 may enter into a child-voice recognition mode if the user is determined to be a child based on the presented content, the user image, and/or the user voice (S300). Since the contents associated with the step S300 were described in the steps S200 to S250 in FIG. 6, the explanation therefor is omitted.

If the robot 100a enters into the child-voice recognition mode, the robot 100a may adjust a preset voice input waiting time and acquire the voice signal including the utterance voice of the user through the microphone 124 (S310). For example, an utterance response speed of the child according to an utterance request of the robot 100a may be slower than an utterance response speed of the adult. To that end, the processor 180 may adjust a voice input waiting time in the child recognition mode to be longer than a voice input waiting time set for the default voice recognition mode.

According to the embodiment, the processor 180 may acquire an image of the child through the camera 142 while waiting for an utterance response of the child. The processor 180 may increase the voice input waiting time consistently if it is recognized from the acquired image that the child looks at the robot 100a or the display 152 of the robot 100a.

The processor 180 may acquire the voice signal including the voice uttered from the user (the child) through the microphone 124. According to the embodiment, the processor 180 may control the communication interface 110 such that the acquired voice signal is transmitted to the server 200.

The robot 100a or the server 200 may adjust the acquired voice signal to correspond to a characteristic of the voice recognition reference data (S320). As described above, the voice recognition reference data may be created on the basis of a voice of an adult male. To that end, the processor 180 of the robot 100a or the processor 260 of the server 200 may adjust the signal characteristic of the acquired voice signal to correspond to a characteristic of the voice recognition reference data.

In this regard, with reference to region (a) of FIG. 10, if the user is the child, a frequency (a user frequency) of the voice acquired from the user may be higher than the preset reference frequency (for example, a default frequency of the voice uttered by the adult male). To that end, the processor 180 or 260 may shift the frequency of the acquired voice signal to correspond to a frequency band of the voice recognition reference data.

In addition, with reference to region (b) of FIG. 10, a volume (an intensity) of the voice uttered by the user (for example, a volume of the voice uttered by the child) may be lower than a volume of a reference voice (for example, a volume of the voice uttered by the adult male). To that end, the processor 180 or 260 may amplify the acquired voice signal to correspond to a volume (an intensity) of the voice of the voice recognition reference data. According to the embodiment, the processor 180 or 260 may filter a noise component increasing according to amplification of the voice signal. For example, the characteristic of the acquired voice signal may correspond to the characteristic of the voice recognition reference data by the frequency shift, signal amplification and the filtering of the noise.

Meanwhile, if a voice signal including a voice uttered by not the user but another user is acquired, the processor 180 or 260 may process the voice of another user as a noise, may not adjust the acquired voice signal, or may not recognize the voice included in the voice signal. For example, the processor 180 or 260 may adjust and recognize only a voice signal corresponding to a voice of the user as originally recognized.

Referring to FIG. 9, the robot 100a or the server 200 may recognize the voice from the adjusted voice signal (S330). The processor 180 or 260 may recognize the voice uttered by the user through a previously published voice recognition scheme, from the voice signal adjusted according to the step S320. For example, the robot 100a or the server 200 may provide voice recognition accuracy above a predetermined level for users having different characteristics by estimating the user of the robot 100a and recognizing the voice in the voice recognition mode corresponding to the estimated attributes of the user.

Figure 11:
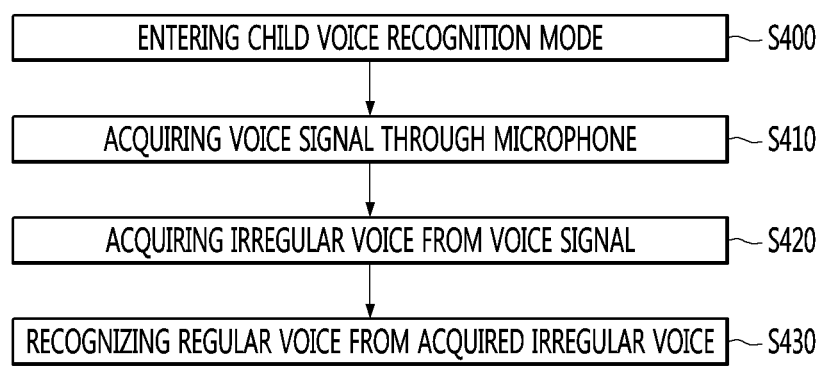
FIG. 11 is a flowchart for explaining an embodiment an operation that the robot or the server performs a voice recognition in a child-voice recognition mode.

FIG. 11 is a flowchart for explaining an embodiment an operation that the robot or the server performs a voice recognition in a child-voice recognition mode. With regard to FIG. 11, the steps S400 and S410 may be substantially identical to the steps S300 and S310 of FIG. 9. The robot 100a or the server 200 may acquire an irregular voice from the acquired voice signal (S420).

The irregular voice of the present disclosure may indicate voices such as phrases or sentences having a conversation style and grammatical errors, which are not formalized voices (regular voices) that the robot 100a can recognize and process. In general, the language ability of a child is lower than that of the adult and the child's voice may have relatively higher possibility to utter the irregular voice than the adult. Conventional voice recognition devices (e.g., robot, server and so forth) may have a remarkably low voice recognition rate for the irregular voice, or may not correctly recognize contents of the irregular voice (e.g., the child's voice).

The robot 100a or the server 200 may recognize the regular voice from the acquired irregular voice (S430). The regular voice of the present disclosure corresponds to a formalized voice that the robot 100a or the server 200 can recognize and process. For example, the regular voice may mean phrases or sentences not having grammatical errors, and words, phrases or sentences having a shape previously defined between the robot 100a and the user.

For example, the processor 180 or 260 may recognize the regular voice from the irregular voice by using the learning model previously learned by the learning processor 130 or 240. The learning model may include the ANN learned and constructed based on the machine learning (for example, deep learning). The robot 100a or the server 200 may understand a meaning of the voice uttered by the user exactly, or perform an operation corresponding to the uttered voice normally, by recognizing the regular voice from the irregular voice using the learning model.

Figure 12:
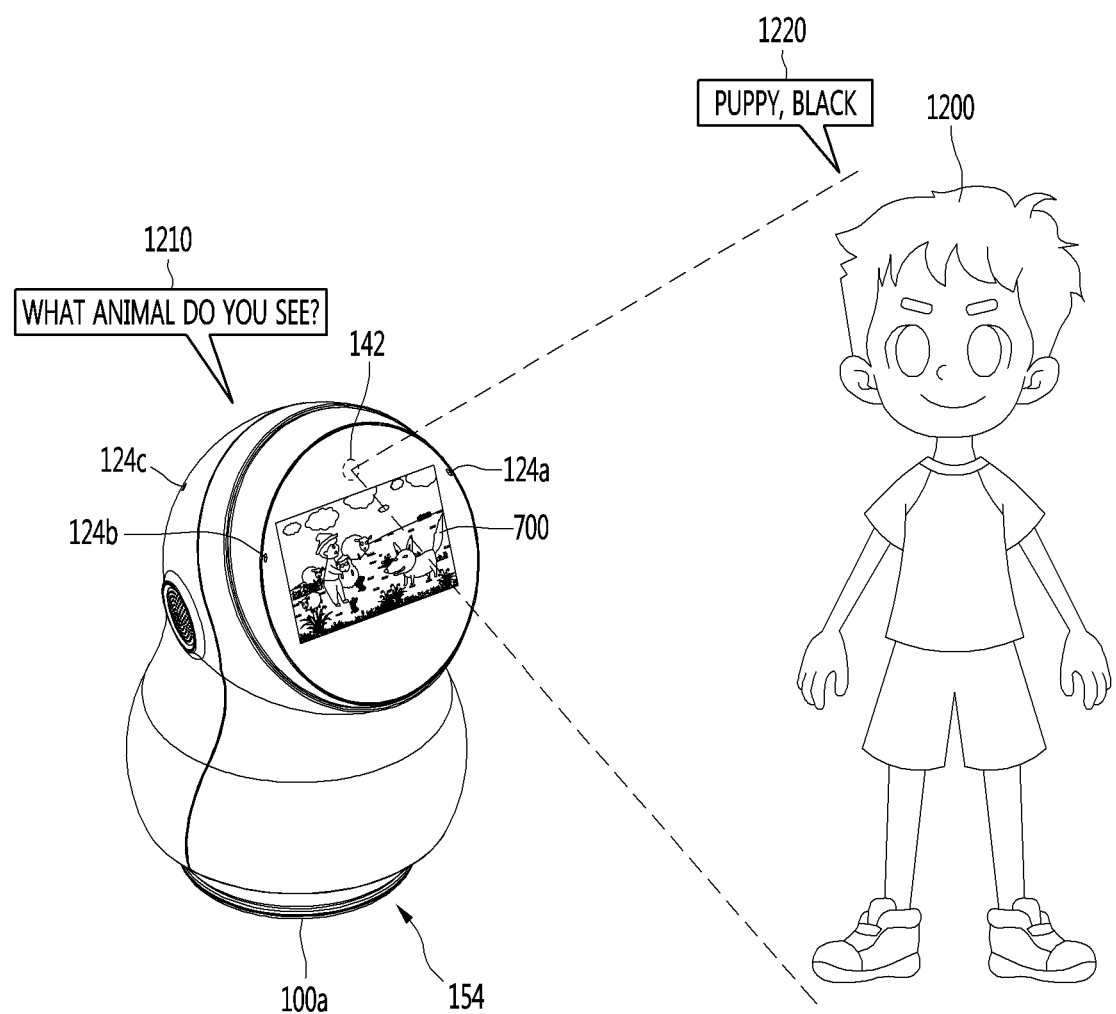
FIGS. 12 and 13 are exemplified views associated with the embodiment illustrated in FIG. 11.
Figure 13:
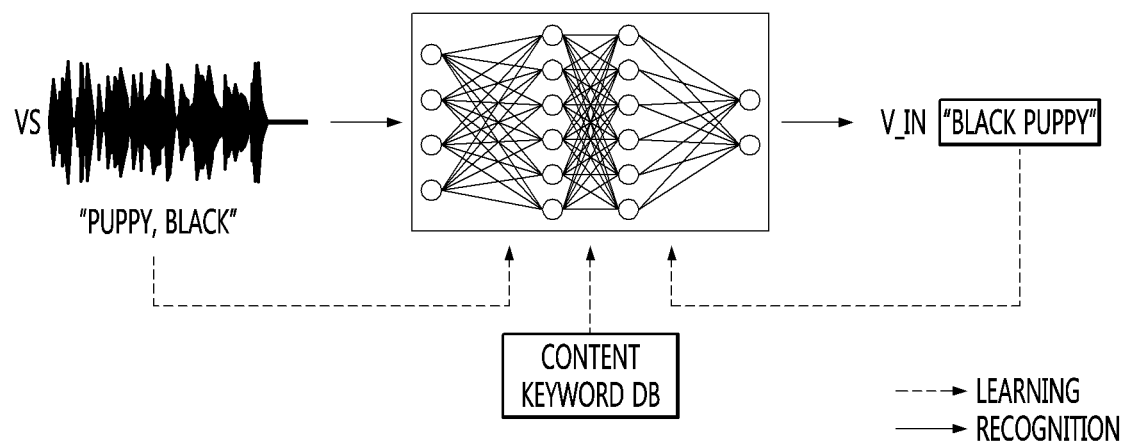

FIGS. 12 and 13 are exemplified views associated with the embodiment illustrated in FIG. 11. With reference to FIGS. 12 and 13, the robot 100a may provide the user 1200 with a fairy tale content for education. When providing the fairy tale content for education, the processor 180 may output the screen 700 associated with the content through the display 152, or output a sound associated with the content through the speaker 154. The processor 180 may determine that the user 1200 is the child based on the content, the user image and/or the voice of the user, and may switch the voice recognition mode to the child voice recognition mode, as previously described.

According to the embodiment, while the content is provided, the processor 180 may derive a response of the user 1200 by outputting an inquiry message 1210 to the user 1200. The user 1200 may utter a response 1220 based on the outputted inquiry message 1210. Response data corresponding to the inquiry message 1210 may be previously stored in the data associated with the content. For example, the response data corresponding to the inquiry message 1210 may be "a black puppy" or "a black-colored puppy". In this case, the regular voice described in FIG. 11 may correspond to "the black puppy" or "the black-colored puppy".

The user 1200 may utter the response 1220 "puppy black" based on the inquiry message 1210. The response 1220 may be the irregular voice having a grammatical error or corresponding to an incomplete sentence. The processor 180 may acquire the response 1220 through the microphones 124a to 124c. The acquired response 1220 may correspond to a voices signal (VS) including the irregular voice "puppy black". According to the embodiment, the processor 180 may transmit the voice signal (VS) to the server 200.

If the irregular voice is recognized from the acquired voice signal (VS), the processor 180 or 260 may input the voice signal (VS) (or a text or code corresponding to the irregular voice) with the learning model learned by the learning processor 130 or 240. The learning model may correspond to the above-described ANN 231a described in FIG. 2.

The learning processor 130 or 240 may perform a learning operation by using various voice signals and a content keyword DB having keywords associated with the content, and may create the learning model (e.g., the ANN) according to performance of the learning operation. For example, the learning model may recognize the regular voice based on the keywords included in the content keyword DB, from the irregular voice corresponding to the inputted voice signal.

The processor 180 or 260 may recognize a regular voice (V_IN) from the acquired voice signal (VS), through the learning model. For example, the learning model may output the regular voice (V_IN) "the black puppy" as a recognition result from the inputted voice signal (VS). In this case, the processor 180 or 260 may determine that the user 1200 utters a right response for an inquiry message 1210. For example, the robot 100a or the server 200 may smoothly recognize the voice uttered from the user 1200, in particular, a user such as a child, which has a high utterance frequency of the irregular voice, and may recognize a meaning based on the recognized voice or perform the operation.

According to an embodiment of the present disclosure, the robot or the sever connected thereto may estimate the characteristic of the user based on the content and the image and the voice of the user, and may recognize the voice of various users more exactly through the voice recognition mode corresponding to the characteristic of the estimated attribute(s) of a user. In addition, the robot or the server may recognize the voice uttered from the child using the robot more exactly, through the child-voice recognition mode reflecting an utterance characteristic and a language ability of the child. In addition, the robot or server may improve a recognition rate relative to a voice that is not the voice having a previously defined shape, by smoothly recognizing the uttered voice by using the learning model as previously learned, for the voice uttered from the user such as the child, having a high utterance frequency of the irregular voice.

An aspect of the present disclosure provides a robot and a server capable of improving voice recognition accuracy by estimating a characteristic of a user uttering a voice to perform a voice recognition operation, and a method for recognizing the voice using the robot. Another aspect of the present disclosure provides a robot and a server capable of improving voice recognition accuracy particularly for children, and a method for recognizing the voice using the robot.

The robot according to an embodiment of the present disclosure comprises: an output interface configured to output a corresponding content in response to a content entry request; a camera configured to acquire an image including a user; a microphone configured to acquire a first voice signal including a voice uttered from the user; and a processor configured to estimate a characteristic of the user based on at least one of the content, the image or the first voice signal, and recognize the voice of the user through a voice recognition mode corresponding to the estimated characteristic.

The characteristic of the user may include at least one of gender or an age group. According to the embodiment, the processor may estimate the characteristic of the user based on at least one information of a name of the outputted content, a category, age limit information, or user statistics.

According to the embodiment, the processor may estimate the characteristic of the user based on a body characteristic of the user and a characteristic of wearing clothes included in the image. According to the embodiment, the processor may estimate the characteristic of the user based on at least one of a frequency characteristic of the first voice signal, a signal intensity of the first voice signal, or an utterance characteristic based on a recognition of the voice included in the first voice signal. According to the embodiment, the processor may set the voice recognition mode to a child-voice recognition mode when the estimated characteristic of the user corresponds to a child, and increase a voice input waiting time more than a default voice recognition mode.

According to the embodiment, the processor may acquire a second voice signal including the voice uttered by the user through the microphone, when the voice recognition mode corresponds to the child-voice recognition mode; shift a frequency of the second voice signal to correspond to a frequency band of a predetermined voice recognition reference data; amplify an intensity of the second voice signal to correspond to an intensity of the voice recognition reference data; and recognize the voice uttered by the user from the shifted and amplified second voice signal.

According to the embodiment, the processor may acquire a third voice signal including an irregular voice uttered by the user through the microphone, while operating in the child-voice recognition mode; and recognize a regular voice from the third voice signal or the irregular voice through a learning model stored in a memory, when the irregular voice is recognized from the acquired third voice signal, and the learning model may include an artificial neural network (ANN) based on machine learning. According to the embodiment, the processor is configured to switch from the child-voice recognition mode to the default voice recognition mode when terminating an output of the content.

The robot may further comprise a communication interface configured to connect to a server, and the processor may transmit at least one of information associated with the content the image or the first voice signal to the server, acquire an estimating result for the characteristic of the user from the server, and set the voice recognition mode corresponding to the acquired estimating result.

A server according to the embodiment of the present disclosure is connected to a robot acquiring a voice signal including a voice of a user, and the server may comprise: a communication interface configured to connect to the robot; and a processor configured to: receive at least one of information of an outputted content, an image including the user or a first voice signal including the voice of the user, from the robot; estimate a characteristic of the user based on at least one of information of the received content, the image or the first voice signal; and recognize the voice of the user through a voice recognition mode corresponding to the estimated characteristic.

In certain implementations, a device, such as a robot, comprises an output device configured to output a content requested by a user; a camera configured to acquire an image of the user; a microphone configured to acquire a voice signal corresponding to voice content uttered by the user; and a processor configured to: determine a characteristic of the user based on at least one of the outputted content, the image, or the voice signal, and recognize the voice content uttered by the user through a voice recognition mode corresponding to the determined characteristic.

The characteristic of the user includes at least one of gender of the user or an age group of the user. The processor is configured to determine the characteristic of the user based on at least one of a name of the outputted content, a category of the outputted content, age limit information of the outputted content, or user statistics of the outputted content.

The processor is configured to determine the characteristic of the user based on at least one of a characteristic of the user's body in the image, or a characteristic of clothes worn by the user in the image. The processor is configured to determine the characteristic of the user based on at least one of a frequency characteristic of the voice signal, a signal intensity of the voice signal, or an utterance characteristic associated with recognition of the voice content.

The processor is configured to set the voice recognition mode to a child-voice recognition mode when the determined characteristic of the user is associated with a child, and wherein the child-voice recognition mode uses a voice input waiting time that is more than that used in a default voice recognition mode. The processor, when recognizing the voice content uttered by the user based on the voice recognition mode being set to the child-voice recognition mode, is further configured to: shift a frequency of the voice signal to correspond to a frequency band of a predetermined voice recognition reference data; amplify an intensity of the voice signal to correspond to an intensity of the voice recognition reference data; and recognize the voice content uttered by the user from the shifted and amplified voice signal.

The processor, when recognizing the voice content uttered by the user based on the voice recognition mode being set to the child-voice recognition mode, is configured to: recognize a regular voice from an irregular voice included in the voice signal through a learning model, wherein the learning model includes an artificial neural network (ANN) based on machine learning. The processor is configured to switch from the child-voice recognition mode to the default voice recognition mode when terminating [[an]] output of the content.

The device may comprise a communication interface configured to connect to a server, wherein the processor is configured to: transmit information associated with at least one of the content, the image, or the first voice signal to the server; acquire data identifying the determined characteristic of the user from the server; and set the voice recognition mode corresponding to the acquired data.

In certain implementations, a server comprises: a communication interface configured to connect to a device that acquires voice content of a user; and a processor configured to: receive, via the communication interface, at least one of information about content outputted to the user, an image of the user, or a voice signal including the voice content of the user from the device; determine a characteristic of the user based on at least one of the information about the content, the image, or the first voice signal; and recognize the voice content of the user through a voice recognition mode corresponding to the determine characteristic, wherein the determined characteristic of the user includes at least one of gender of the user or an age group of the user.

The processor, when determining the characteristic of the user based on the information about the content, may be further configured to determine the characteristic of the user based on at least one of a name of the content, a category of the content, age limit information of the content, or user statistics of the content, the processor, when determining the characteristic of the user based on the image of the user, is further configured to determine the characteristic of the user based on at least one of a characteristic of the user's body in the image or a characteristic of clothes worn by the user in in the image, and the processor, when determining the characteristic of the user based on the voice signal, is further configured to determine the characteristic of the user based on at least one of a frequency characteristic of the voice signal, a signal intensity of the voice signal, or an utterance characteristic based on recognition of the voice content.

The processor may be configured to set the voice recognition mode to a child-voice recognition mode when the determined characteristic of the user corresponds to a child, and wherein the child-voice recognition mode includes a voice input waiting time that is more than that of a default voice recognition mode. The processor, when recognizing the voice content of the user based on setting the voice recognition mode to the child-voice recognition mode, is further configured to: shift a frequency of the voice signal to correspond to a frequency band of a predetermined voice recognition reference data; amplify an intensity of the voice signal to correspond to an intensity of the voice recognition reference data; and recognize the voice content of the user from the shifted and amplified voice signal.

The processor may be configured to recognize a regular voice from an irregular voice included in the voice signal through a learning model, wherein the learning model includes an artificial neural network (ANN) based on machine learning.

In another implementation, a method of managing a device comprises: outputting content to a user; acquiring an image of the user; acquiring a voice signal including voice content uttered by the user; determining a characteristic of the user including at least one of a gender of a user and an age group of the user based on at least one of the content, the image or the voice signal; and recognizing the voice content uttered by the user using a voice recognition mode corresponding to the determined characteristic.

Determining the characteristic of the user includes at least one of: determining the characteristic of the user from at least one of a name of the content, a category of the content, age limit information for the content, or user statistics of the content; determining the characteristic of the user based on at least one of a characteristic of a body of the user in the image or a characteristic of clothes worn by the user in the image; or determining the characteristic of the user based on at least one of a frequency characteristic of voice signal, a signal intensity of the voice signal or an utterance characteristic based on recognition of the voice content.

Recognizing the voice content includes may include setting the voice recognition mode to a first voice recognition mode when the determined characteristic of the user corresponds to at least one of a particular age group or a particular gender, the first recognition mode having a voice input waiting time that is more than that of a second voice recognition mode that is used when the determined characteristic of the user does not correspond to the at least one of the particular age group or the particular gender; and recognizing the voice content uttered by the user based on the first voice recognition mode.

Recognizing the voice content uttered by the user based on the first voice recognition mode may include: shifting a frequency of the voice signal to correspond to a frequency band of a predetermined voice recognition reference data; amplifying an intensity of the voice signal to correspond to an intensity of the voice recognition reference data; and recognizing the voice content from the shifted and amplified second voice signal. In certain examples, recognizing the voice content uttered by the user based on the first voice recognition mode may include recognizing a regular voice from an irregular voice included in the voice signal through a learning model including an artificial neural network (ANN) based machine learning.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device comprising:
    an output device configured to output content requested by a user;
    a camera configured to acquire an image of the user;
    a microphone configured to acquire a voice signal corresponding to voice content uttered by the user; and
    a processor configured to:
        determine a characteristic of the user based on at least one of the outputted content, the image, or the voice signal, and
        recognize the voice content uttered by the user through a voice recognition mode corresponding to the determined characteristic of the user,
        wherein the processor is configured to set the voice recognition mode to a child-voice recognition mode when the determined characteristic of the user is associated with a child, and wherein the child-voice recognition mode uses a voice input waiting time that is more than that used in a default voice recognition mode.

2. The device of claim 1, wherein the characteristic of the user includes at least one of gender of the user or an age group of the user.

3. The device of claim 1, wherein the processor is configured to determine the characteristic of the user based on at least one of a name of the outputted content, a category of the outputted content, age limit information of the outputted content, or user statistics of the outputted content.

4. The device of claim 1, wherein the processor is configured to determine the characteristic of the user based on at least one of a characteristic of a body of the user body in the image, or a characteristic of clothes worn by the user in the image.

5. The device of claim 1, wherein the processor is configured to determine the characteristic of the user based on at least one of a frequency characteristic of the voice signal, a signal intensity of the voice signal, or an utterance characteristic associated with recognition of the voice content.

6. The device of claim 1, wherein the processor, when recognizing the voice content uttered by the user based on the voice recognition mode being set to the child-voice recognition mode, is further configured to:
    shift a frequency of the voice signal to correspond to a frequency band of a predetermined voice recognition reference data;
    amplify an intensity of the voice signal to correspond to an intensity of the voice recognition reference data; and
    recognize the voice content uttered by the user from the shifted and amplified voice signal.

7. The device of claim 1, wherein the processor, when recognizing the voice content uttered by the user based on the voice recognition mode being set to the child-voice recognition mode, is configured to:
    recognize a regular voice from an irregular voice included in the voice signal through a learning model,
    wherein the learning model includes an artificial neural network (ANN) based on machine learning.

8. The device of claim 1, wherein the processor is configured to switch from the child-voice recognition mode to the default voice recognition mode when terminating output of the content.

9. The device of claim 1, further comprising a communication interface configured to connect to a server located remotely from the device,
    wherein the processor is configured to:
        transmit information associated with at least one of the content, the image, or the voice signal to the server;
        acquire data identifying the determined characteristic of the user from the server; and
        set the voice recognition mode corresponding to the acquired data from the server.

10. A server comprising:
    a communication interface configured to connect to a device that acquires voice content of a user; and
    a processor configured to:
        receive, via the communication interface, at least one of information about content outputted to the user, an image of the user, or a voice signal including the voice content of the user from the device;
        determine a characteristic of the user based on at least one of the information about the content, the image, or the voice signal; and recognize the voice content of the user through a voice recognition mode corresponding to the determine characteristic, wherein the determined characteristic of the user includes at least one of gender of the user or an age group of the user, wherein the processor is configured to set the voice recognition mode to a child-voice recognition mode when the determined characteristic of the user corresponds to a child, and wherein the child-voice recognition mode includes a voice input waiting time that is more than that of a default voice recognition mode that is used when the determined characteristic of the user does not correspond to a child.

11. The server of claim 10, wherein:

the processor, when determining the characteristic of the user based on the information about the content, is further configured to determine the characteristic of the user based on at least one of a name of the content, a category of the content, age limit information of the content, or user statistics of the content, the processor, when determining the characteristic of the user based on the image of the user, is further configured to determine the characteristic of the user based on at least one of a physical characteristic of the user in the image or a characteristic of clothes worn by the user in in the image, and the processor, when determining the characteristic of the user based on the voice signal, is further configured to determine the characteristic of the user based on at least one of a frequency characteristic of the voice signal, a signal intensity of the voice signal, or an utterance characteristic associated with recognition of the voice content.

12. The server of claim 10, wherein the processor, when recognizing the voice content of the user based on setting the voice recognition mode to the child-voice recognition mode, is further configured to:

shift a frequency of the voice signal to correspond to a frequency band of a predetermined voice recognition reference data;

amplify an intensity of the voice signal to correspond to an intensity of the voice recognition reference data; and recognize the voice content of the user from the shifted and amplified voice signal.

13. The server of claim 10, wherein the processor is configured to recognize a regular voice from an irregular voice included in the voice signal through a learning model, wherein the learning model includes an artificial neural network (ANN) based on machine learning.

14. A method of managing a device, the method comprising:

outputting content to a user;

acquiring an image of the user;

acquiring a voice signal including voice content uttered by the user;

determining a characteristic of the user including at least one of a gender of the user or an age group of the user based on at least one of the content, the image or the voice signal; and recognizing the voice content uttered by the user using a voice recognition mode corresponding to the determined characteristic of the user, wherein recognizing the voice content includes:

setting the voice recognition mode to a first voice recognition mode when the determined characteristic of the user corresponds to at least one of the particular age group or a particular gender, the first recognition mode having a voice input waiting time that is more than that of a second voice recognition mode that is used when the determined characteristic of the user does not correspond to the at least one of the particular age group or the particular gender; and recognizing the voice content uttered by the user based on the first voice recognition mode when the voice recognition mode is set to the first voice recognition.

15. The method of claim 14, wherein determining the characteristic of the user includes at least one of:

determining the characteristic of the user from at least one of a name of the content, a category of the content, age limit information for the content, or user statistics of the content;

determining the characteristic of the user based on at least one of an attribute of a body of the user in the image or an attribute of a clothing item worn by the user in the image; or determining the characteristic of the user based on at least one of a frequency characteristic of voice signal, a signal intensity of the voice signal or an utterance characteristic based on recognition of the voice content.

16. The method of claim 14, wherein recognizing the voice content uttered by the user based on the first voice recognition mode includes:

shifting a frequency of the voice signal to correspond to a frequency band of a predetermined voice recognition reference data;

amplifying an intensity of the voice signal to correspond to an intensity of the voice recognition reference data; and recognizing the voice content from the shifted and amplified second voice signal.

17. The method of claim 14, wherein recognizing the voice content uttered by the user based on the first voice recognition mode includes:

recognizing a regular voice from an irregular voice included in the voice signal through a learning model including an artificial neural network (ANN) based machine learning.

* * * * *